United States Patent [19]

Teets

[11] Patent Number: 4,682,420

[45] Date of Patent: Jul. 28, 1987

[54] CENTER HEIGHT GAGE FOR CUT-OFF TOOLS

[75] Inventor: Bradley Teets, Budd Lake, N.J.

[73] Assignee: Iscar Ltd., Nahariya, Israel

[21] Appl. No.: 938,807

[22] Filed: Dec. 8, 1986

[51] Int. Cl.$^4$ .............................................. G01B 5/24
[52] U.S. Cl. .......................................... 33/626; 33/520
[58] Field of Search ............ 33/169 C, 172 D, 181 R, 33/185 R, 520

[56] References Cited

U.S. PATENT DOCUMENTS

| | | | |
|---|---|---|---|
| 2,674,045 | 4/1954 | Lakomski | 33/185 R |
| 3,079,694 | 3/1963 | Yemmans | 33/185 R |
| 4,215,482 | 8/1980 | Szewczyk | 33/185 R |
| 4,626,151 | 12/1986 | Dietrich | 33/185 R |

*Primary Examiner*—Richard R. Stearns
*Attorney, Agent, or Firm*—Ronald G. Goebel

[57] ABSTRACT

The invention provides a gage for measuring the center height of a cylindrical workpiece. The gage includes an elongate body having an arcuate face portion with a plurality of numbers in sequence thereon indicating a value of the diameter of the workpiece. The face portion also includes a plurality of substantially vertical lines, each line corresponding to each one of the sequential numbers and a horizontal centerline. A plurality of horizontal indicator lines extend above and below the centerline, each line indicating a value corresponding to a distance above or below the center height of the workpiece. An indicator consisting of an indicator arm positioned along the centerline and a pair of feeler arms is pivotably mounted on the body. The gage is slidably inserted in the recess of a cut-off tool holder and moved alongside a workpiece. The indicator arm will then move upwardly or downwardly. The intersection point of the upper horizontal surface of the indicator arm with the vertical line following each number corresponding to the workpiece diameter will indicate the distance the cut-off tool is below or above the centerline of the workpiece.

7 Claims, 4 Drawing Figures

CENTER HEIGHT GAGE FOR CUT-OFF TOOLS

BACKGROUND OF THE INVENTION

This invention is concerned with a gage for measuring the center height of a cylindrical workpiece to be cut by a cut-off tool.

Cut-off tools are used to cut off the end part or end parts of pieces subjected to metal cutting operations. Such ends are usually cylindrical and it is important that the tool be set with respect to the center height of the workpiece end at a certain amount to ensure proper cutting action, e.g. about 0.007 in. above centerline. If the cut-off tool is too far above the centerline the tool will push the part off rather than cut it. If the tool is below centerline it passes beneath the center of the part and breaks it off or the tool itself will break.

The most common method of setting the cut-off tool to center height on a screw machine is by using a solid test bar. In this procedure the cut-off tool holder and blade assembly are mounted onto the cross-slide so that the cutting edge of the blade will cut slightly above the center of the test bar and the leading edge of the blade will reach the center of the test bar when the cross-slide is at high point. The test bar is positioned so the cut-off tool will only make a narrow cut, approximately 1/16 in. in the bar. This cut will leave a small nib at the center of the test bar. The diameter of the nib is then measured with calipers or a micrometer. One half of this measurement is taken and the cut-off tool holder and blade assembly is raised on the cross-slide that distance. A second test cut is then made. If a clean cut is made without leaving a nib or galled surface at the center of the test bar, the cut-off tool is on center.

Another common method is to take several trial cuts and closely observe the tool as it goes to center.

The above described method of centering cut-off tools are time consuming and inaccurate for the most part.

If the height from the cut off tool's cutting point to the centerline of the bar can be predetermined the tool can be readily adjusted. One way to accomplish this is by use of a gage which will determine center height of the cut-off tool relative to the centerline of the piece.

One centering gage currently available contains magnetic locaters which are placed against the end piece to be cut and is equipped with a bubble site level. By adjusting the cutting tool so that the tip is in contract with the levelled gage the work centerline is determined. This gage is used primarily for turning tools and has the disadvantage of assuming the side of the gage is parallel to the floor and that the machine holding the piece is level. In many cases the slide of the cut-off tool is also not level.

The present invention, on the other hand, provides a center height gage for a cut-off tool which provides an accurate and speedy determination of the deviation above or below centerline of the cut-off tool which accuracy extends over a wide range of diameters of end pieces to be cut thereby having wide application in metal cutting operations.

SUMMARY OF THE INVENTION

In brief, the invention comprises a gage body slidably insertable in the holder of a cut-off tool which measures the center height of a workpiece to be cut off by the tool. The gage has an arcuate face portion across the top of which is inscribed a plurality of sequential numbers corresponding to the diameter of a cylindrical workpiece to be cut off, e.g. 1.0 in. to 6.0 in. in 0.5 in. increments. A plurality of substantially vertical lines are disposed aside each number. In the middle of the tool portion is a horizontal centerline indicating substantially the true center height of the workpiece. Actually the centerline corresponds to a height of 0.007 in. above the height of the gage to prevent the workpiece from being broken off or the cut-off tool from breaking during cutting. Above and below the centerline are four lines corresponding to heights above the center height of the piece, e.g. 0.012, 0.017, 0.037 and 0.097 inches.

Pivotably mounted in the body is an indicater having an indicator arm which extends across the face portion and a pair of feeler arms defining an angle of between about 140° to 180°. The indicator arm's top surface coincides with the horizontal centerline on the face portion.

The gage is used by placing it in the tool holder of the cut-off tool and moving it into the cylindrical workpiece until the feeler arms engage the surface of the workpiece. If the setting for the cut-off tool is not at the center height of the piece the indicator arm will move above or below the centerline depending on whether the setting is so disposed. By reading the value on one of the horizontal lines above or below the centerline where the indicator arm intersects the vertical line corresponding to the workpiece diameter the height above or below center height of the workpiece is determined. The cut-off tool is then reset to make the correction and then the piece is cut off.

Means for adjusting the indicator arm is also provided to allow for looser manufacturing tolerances. A rectangular section is formed in the body having a central bore. An adjustment cam and pin inserted in the cam is fittable within this base. The cam itself has a base through which a shoulder screw is inserted. This screw also passes through an opening in the indicator. A knob is threaded to the shoulder screw to complete the assembly. A pair of adjustment screws are located at the top and bottom of the cam pin in the rectangular section. If the indicator arm does not coincide with the centerline the adjustment screws are used to move the cam so that calibration of the arm can be achieved.

BRIEF DESCRIPTION OF THE DRAWINGS

FIG. 2A shows an enlarged view of the scales of the gage;

DETAILED DESCRIPTION OF THE PREFERRED EMBODIMENTS

Figure 1:
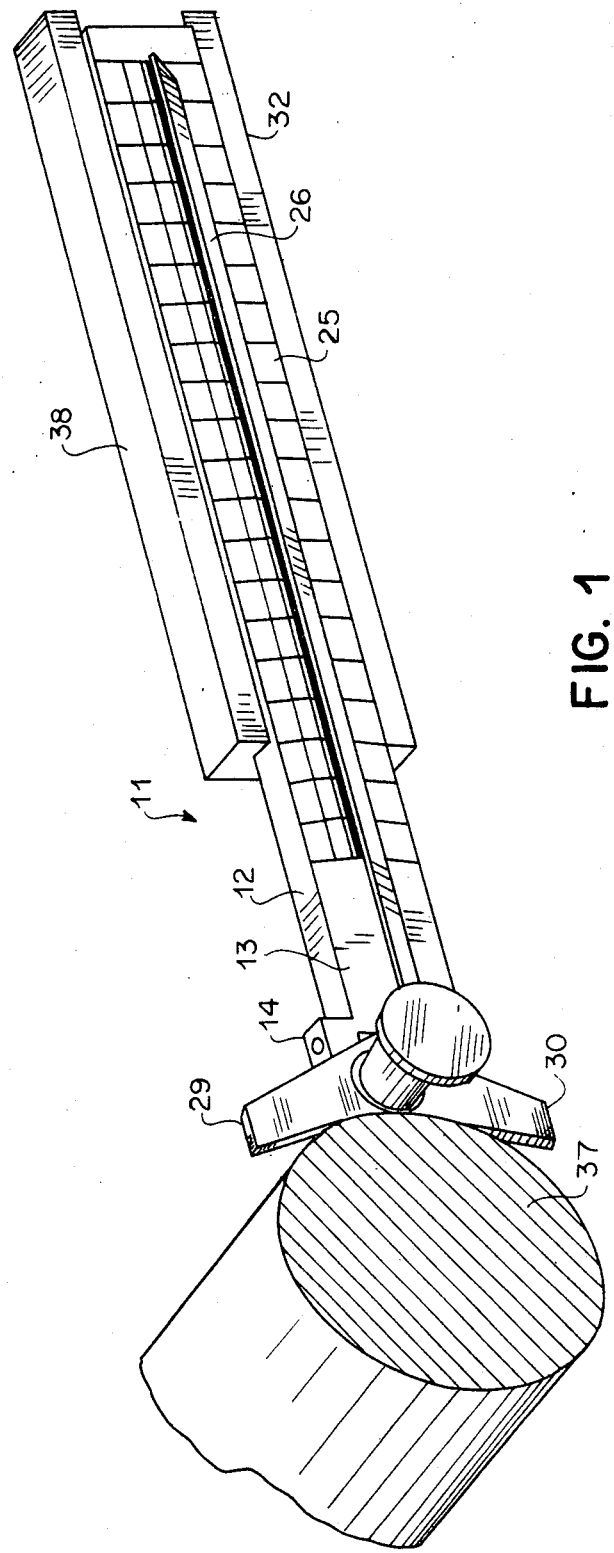
FIG. 1 shows an assembled center height gage in a holder engaging a workpiece to be cut-off in a holder.
Figure 2:
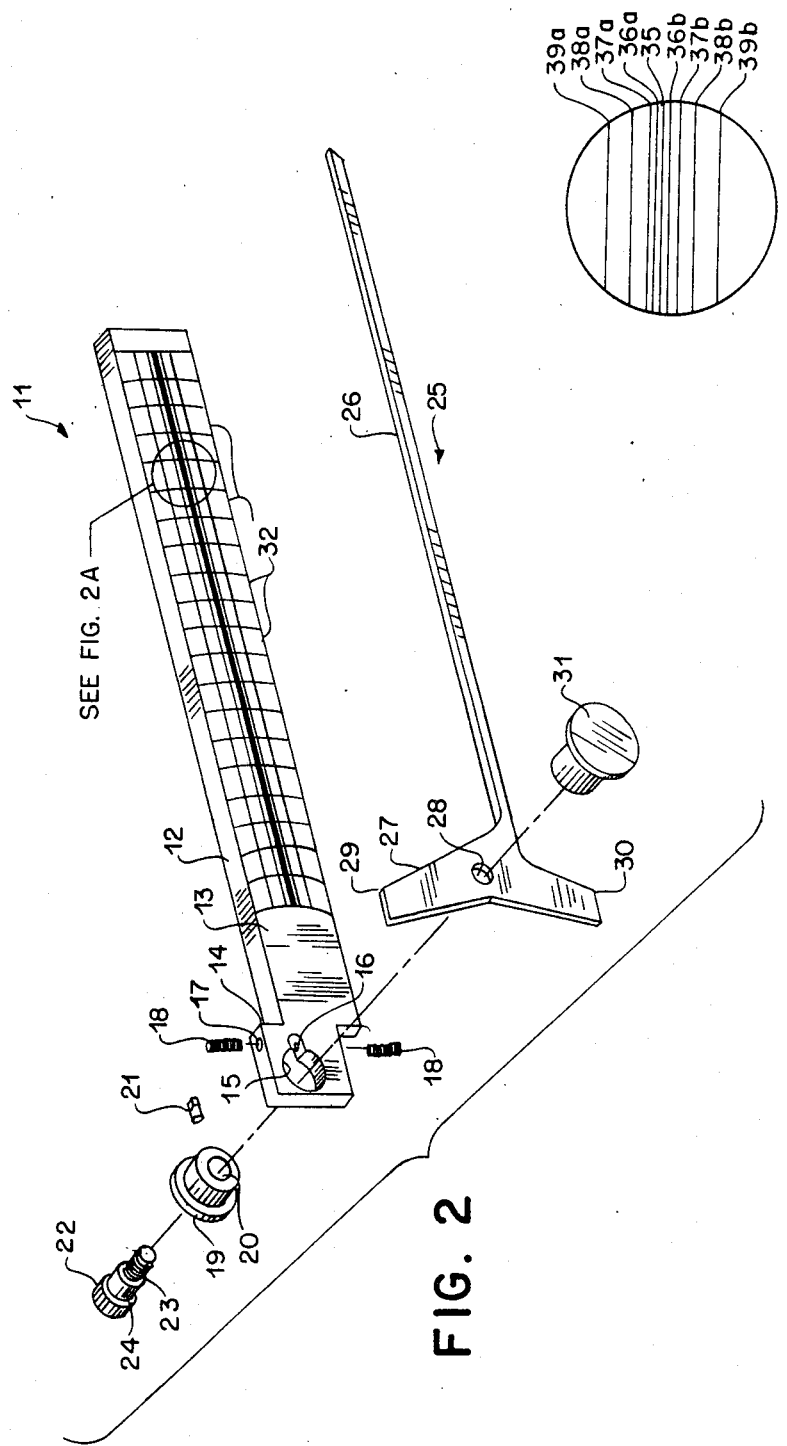
FIG. 2 shows an exploded view of the assembly of the center height gage.

Referring to FIGS. 1 & 2 there is shown a center height gage for a cut-off tool indicated generally by 11 consisting of a body 12 having an arcuate face section 13. The body has formed therein a rectangular pivot support section 14 having a central cam bore 15 and pin recess 16 communicating therewith rearwardly of said cam base. An internally threaded vertical bore 17 extends vertically through the top edge of the rectangular pivot support and straddles the pin recess at the top and bottom thereof. This vertical bore accomodates two adjustment screws 18 whose function will be described in more detail hereafter. An adjustment cam 19 having eccentric circular bore 20 is rotatably fittable within central bore 15. A cam pin 21 is inserted in a radial recess in the cam (not shown) and is accomodated in the pin recess 16. Vertical movement of the pin 21 will rotate the adjustment cam accordingly. A shoulder screw 22 having externally threaded end 23 and raised neck 24 is insertable in the eccentric circular bore 20 of the adjustment cam. The gage further comprises an indicator indicated generally by 25 consisting of indicator arm 26 and feeler 27 having feeler bore 28. The feeler has two arms 29 and 30 which are displaced at an angle of between 140° and 180°. With the adjustment cam and pin inserted in bore 15 and recess 16, respectively, the shoulder screw 22 is inserted through the cam bore and feeler bore. Internally threaded knob 31 is tightened on the externally threaded base 23 of the shoulder screw to complete the assembly. The indicator 25 is then able to pivot through a horizontal axis.

Figure 3:
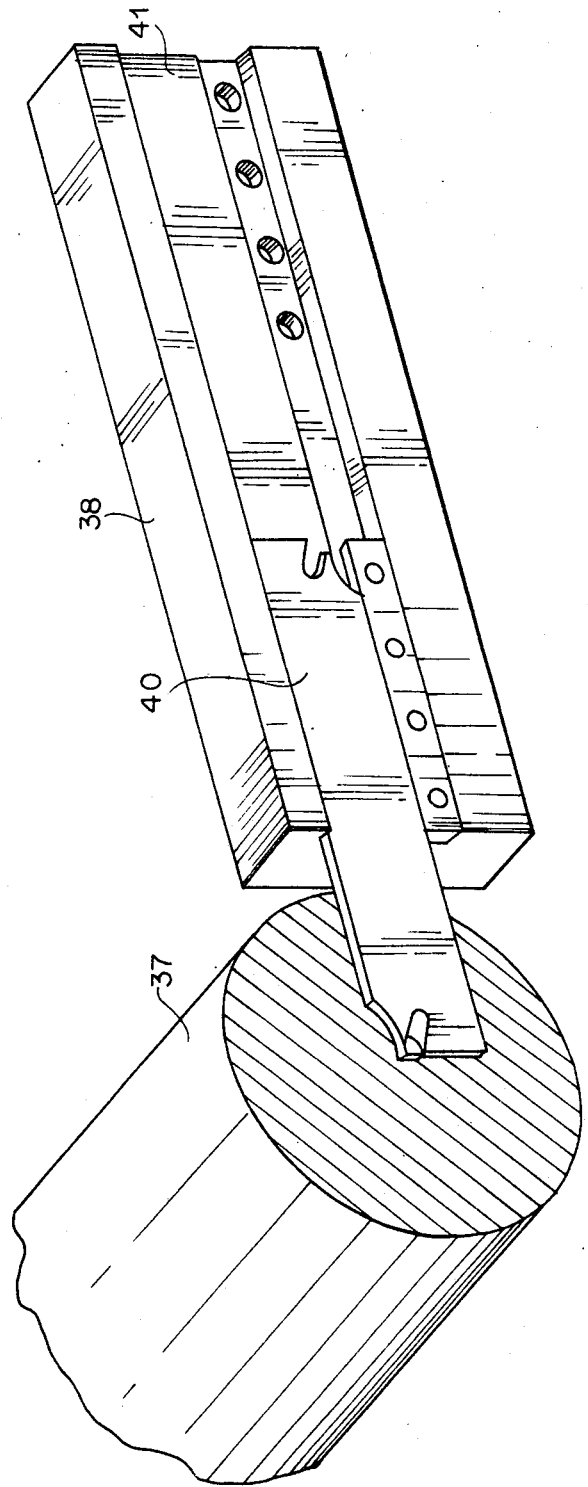
FIG. 3 shows a cut-off tool engaging a workpiece to cut off.

The arcuate face section 13 has engraved therein a series of graduated numbers corresponding to the diameter of a workpiece to be cut off, viz, from 1.0 to 6.0 in., in 0.5 in. increments. A series of vertical lines 32 enclose each number except the 1.0 in. number. Running horizontally across the face section are nine (9) lines shown in FIG. 2A; a centerline indicated by 35 and equally spaced from the top and bottom of that centerline respectively, four other lines; 36a & 36b indicating a value of 0.012 in., 37a & 37b indicating a value of 0.017 in., 38a & 38b indicating a value of 0.037 in., and 39a & 39b indicating a value of 0.097 in. The centerline actually indicates a value of 0.007 above the true center of a workpiece to be cut because if the cut-off tool is below center it passes underneath the center and either breaks the part off rather than cutting it off or breaks the cut-off tool itself. Having the cut-off tool set slightly above centerline avoids this. Use of the gage is as follows, referring to FIGS. 1 and 3.

First, the indicator arm 26 is adjusted to zero, that is to coincide with centerline 35 by loosening knob 31 and threading or unthreading adjustment screws 18 against pin 21 which moves adjustment cam 20 which in turn allows the indicator arm to be moved upwardly or downwardly. After zeroing, the knob is again tightened. The gage is then slidably inserted in the recess 41 of a standard holder 38 for the cut-off tool which has a preset center height and moved alongside workpiece 37 to be cut-off by a cut-off tool. The workpiece can vary from 1.0 to 6.0 inches in diameter. The feeler arms 29 and 30 will engage the circumference of the workpiece and in so doing will move the indicator arm 26 upwardly or downwardly. The intersection point of the upper horizontal surface of the arm with the corresponding workpiece diameter line, i.e. the vertical line 32 following each number corresponding to the workpiece diameter (36a or b to 39a or b), will indicate the distance the cut-off tool is below or above the centerline of the workpiece. If the indicator arm indicator arm intersects a point between the centerline and line 36a or between lines 36a and 37a or between lines 37a and 38a or between lines 38a and 39a or between the centerline and lines 36b or between 37b or between lines 37b and 38b or between lines 38b and lines 36b and 39b the reading must be interpolated. The reading is then used to adjust the cut-off tool 40 so that it accurately cuts off the workpiece 37 at its centerline.

The gage of the invention has several advantages. Firstly, the gage accurately measures the distance the cut-off tool is above or below the centerline of the workpiece and does not require several readings and readjustments by trial and error to bring the cut-off tool to correct centerline quickly. The gage is also accurate for a range of diameters.

The distance above or below center is magnified uniformly by reading the intersection point of the indicator arm surface and the corresponding workpiece diameter line. Prior art devices involving feeler arms give a reading which constantly changes as a function of workpiece diameter. For example, in prior art devices if the cut-off tool were 0.10 above center, the indicator would read much differently for a 1.0 in. diameter workpiece than for a 6.0 in. diameter workpiece. This requires the user to make a judgment relating to the necessary adjustment.

Moreover, the angle of 140-180° between the feeler arms decreases the overall length of the gage.

Further, the adjustment for calibration of the indicator arm to zero is simple and precise. Usually this must only be accomplished once which allows looser manufacturing tolerances.

What is claimed is:

1. A gage for measuring the center height of a cylindrical workpiece comprising:
   (a) a body having an arcuate face portion with a plurality of sequential numbers thereon indicating a value of diameter of said workpiece;
   (b) a plurality of substantially vertical lines on said face portion, each line corresponding to each one of said sequential numbers;
   (b) a horizontal centerline extending across said face portion;
   (d) a plurality of horizontal indicator lines extending above and below said centerline, each line indicating a value corresponding to a distance above or below the center height of said workpiece; and
   (e) an indicator pivotably mounted on said body comprising an indicator arm positioned along said horizontal centerline and a pair of feeler arms spaced apart a predetermined angle.

2. The center height of claim 1 wherein said center height gage further comprises means for adjusting said indicator along said centerline.

3. The center height gage of claim 1 wherein said means for adjusting includes an adjustment cam and pin inserted therein fittable in a bore in said body, said indicator arm being rotatably engaged with said adjustment cam and a pair of adjustment screws threadably moveable in said body and engageable with said pin for moving said cam.

4. The center height gage of claim 1 wherein said predetermined angle is from 140° to 180°.

5. The gage of claim 1 wherein said sequential numbers range from 1.0 to 6.0 inches in 0.5 inch increments.

6. A gage for measuring the center height of a cylindrical workpiece comprising:
   (a) a body having an arcuate face portion with a plurality of sequential numbers thereon indicating a value of diameter of said workpiece; (b) a plurality of substantially vertical lines on said face portion, each line corresponding to each one of said sequential numbers;
   (b) a horizontal centerline extending across said face portion;

(d) a plurality of horizontal indicator lines extending above and below said centerline, each line indicating a value corresponding to a distance above or below the center height of said workpiece;

(e) an indicator pivotably mounted on said body comprising an indicator arm extending along said face portion and a pair of feeler arms spaced apart at an angle of between 140° and 180°; and (f) means for adjusting said indicator arm to coincide with said centerline including an adjustment cam and pin inserted therein fittable in a bore in said body, said indicator arm being rotatably engaged with said adjustment cam and a pair of adjustment screws threadably moveable in said body and engageable with said pin for moving said cam.

7. The gage of claim 6 wherein said sequential numbers range from 1.0 to 6.0 inches in 0.5 inch increments.

* * * * *